United States Patent [19]
Frank et al.

[11] Patent Number: 4,488,892
[45] Date of Patent: Dec. 18, 1984

[54] PIVOTAL SHAPED AUXILIARY GAS HEATER FOR GLASS SHEET SHAPING MOLDS

[75] Inventors: Robert G. Frank, Murrysville; George R. Claassen, New Kensington; John J. Ewing, Tarentum, all of Pa.

[73] Assignee: PPG Industries, Inc., Pittsburgh, Pa.

[21] Appl. No.: 459,084

[22] Filed: Jan. 19, 1983

[51] Int. Cl.³ ............................................. C03B 23/03
[52] U.S. Cl. ........................................ 65/106; 65/162
[58] Field of Search ................. 65/107, 271, 106, 273, 65/162

[56] References Cited

U.S. PATENT DOCUMENTS

| | | | |
|---|---|---|---|
| 2,964,105 | 12/1960 | Olson et al. | 65/271 |
| 3,019,558 | 2/1962 | Broadbent et al. | 65/271 |
| 3,273,988 | 9/1966 | Dean et al. | 65/271 |
| 3,440,031 | 4/1969 | Babcock | 65/271 |
| 3,960,535 | 6/1976 | Hamilton et al. | 65/106 |
| 4,047,915 | 9/1977 | Schaffernicht et al. | 65/106 |

FOREIGN PATENT DOCUMENTS 2115575 10/1972 Fed. Rep. of Germany ........ 65/162

Primary Examiner—William Smith
Assistant Examiner—Michael K. Boyer
Attorney, Agent, or Firm—Andrew C. Siminerio; Donald Carl Lepiane; Edward I. Mates

[57] ABSTRACT

A glass sheet is press bent between a pair of bending molds of complementary shape provided with covers using burning gas source means that supplies heat by directing burning gas flames toward the bottom edge of a glass sheet. The burning gas source means is constructed and arranged to be directed toward the path taken by the glass sheet when the latter moves into a shaping position with the press bending molds retracted and to pivot away from the mold covers when the press bending molds engage the glass sheet including its bottom edge during the shaping of the sheet. Preferably, the burning gas source means has a shape that conforms with the shape of the bottom edge of the glass sheet undergoing press bending and has an upwardly directed downstream portion to provide clearance as the glass sheet moves into said shaping position in a direction such that a recessed lower edge portion thereof is the leading edge of the glass sheet during its path of movement into the shaping station.

4 Claims, 4 Drawing Figures

PIVOTAL SHAPED AUXILIARY GAS HEATER FOR GLASS SHEET SHAPING MOLDS

BACKGROUND OF THE INVENTION

1. Field of the Invention

The present invention relates to the shaping of glass sheets, particularly exceptionally large sheets having a non-rectangular outline shape. The glass sheets of the present invention are suspended by tongs and supported thereby for movement through a tunnel-type furnace having a vertical dimension only slightly larger than the vertical dimension of the glass sheet in the orientation suspended from the tongs. The nature of the bend imparted to the glass is such that the lower edge of the glass sheet requires additional heat after the glass sheet leaves the tunnel-type furnace to insure that the shaping of the glass does not cause the glass sheet to develop fissures that lead to breakage.

2. Technical Background and Patents of Interest

Glass sheets are usually shaped successively in a mass production operation by heat softening the glass sheets while conveyed in succession through a tunnel-type furnace. Thereafter, the leading glass sheet of the series moving through the furnace is removed from the furnace. While the removed sheet is still sufficiently hot to be deformed, a pair of press bending molds of complementary curvature sandwich the heat softened glass sheet in pressurized engagement. This pressurized engagement shapes the glass to a desired curvature. After shaping, the bent glass sheet may be quenched, if desired, before it cools to a temperature below that suitable for imparting a temper in the glass by rapid cooling.

If it were practical to maintain the press bending molds and their actuating means within the furnace, the glass sheet would be shaped while within the furnace. However, the elevated temperature of the furnace is not conducive to durability of the moving parts that energize the movement of the press bending molds toward and away from one another. Furthermore, the press bending molds of the glass shaping art are usually provided with covers of a suitable fibrous material such as knit fiber glass cloth to prevent direct contact between the surfaces of the press bending molds and the heat softened glass surface. The fiber glass cover insulates the glass from direct contact with the mold and prevents undesirable marks in the glass surface replicating any departures from surface smoothness in the mold. Furthermore, if the mold were located within the furnace to provide a press bending operation, the fiber glass covers would become worn quite rapidly and thus would require frequent replacement. It would be impossible to replace the fiber glass covers within the furnace without discontinuing the furnace operation to enable operators to obtain access to the molds to remove the covers and replace them with new ones. For reasons just explained, a practical operation requires that a glass shaping station be located outside the furnace.

It has been suggested to heat the press bending molds to elevated temperatures outside the furnace. However, such heating is economically impractical because the large mass and high heat capacity of the press bending molds would require much thermal input to obtain the desired mold temperature. Furthermore, the fiber glass covers would require frequent replacement because they would be continuously exposed to the high temperature imparted to the press bending molds and also would be subject at these high temperatures to the friction involved in sandwiching the covers between moving press bending molds and the opposite surfaces of a heat softened glass sheet.

For reasons just explained, glass sheets have been shaped by pressurized contact with relatively cold press bending molds located outside a tunnel-type furnace. During this operation, and particularly during the shaping, the glass sheet is supported in a substantially vertical orientation, preferably by glass gripping tongs which engage a relatively small portion of the glass sheet and interfere to a minimum with the heating and subsequent cooling of the glass sheet subjected to shaping and quenching operations. However, the present invention to be described later may be employed in conjunction with any well known technique for supporting a glass sheet in a vertical, near vertical or oblique orientation. Several of these alternate glass sheet supporting techniques are described in U.S. Pat. No. 3,333,934 to Seymour, the description of which is incorporated herein by reference.

In any shaping operation wherein the glass is supported in a vertical or oblique orientation, the temperature to which the glass is heated is very critical. If the glass is heated to too high a temperature within the furnace, the glass sheet becomes misshapen and distorted before it reaches a position between the press bending molds. If the glass sheet is not heated to a sufficiently high temperature, it may be chill cracked during the press bending operation.

When a vertically suspended, hot glass sheet of uniform temperature from top to bottom leaves an enclosed furnace, a vertical temperature gradient tends to be established with the lowest temperature along the bottom edge of the glass sheet. This temperature gradient tends to result in temporary tension stresses in the bottom portion of the glass sheet during its press bending. The magnitude of the tension stresses is a function of the steepness of the temperature gradient in the lower portion of the glass sheet. Recently, there has been a need for bent, tempered glass sheets having a vertical dimension longer than those fabricated in the past because of the need for fabricating large tempered glass sheets for automobile rear windows. The fabrication of these larger glass sheets caused a problem of venting along the bottom edge because when the exit door of the furnace opened, a rush of cold ambient air into the furnace from outside the furnace was closer to the bottom portion of the glass sheet than previously fabricated glass sheets of lesser vertical dimension suspended from tongs. This caused the distance between the bottom edge of the glass sheet and the region of coldest air flow into the furnace to be relatively short when fabricating bent glass sheets of larger vertical dimension. Consequently, the temperature gradient from top to bottom of the larger glass sheets leaving the furnace was more severe than was the case with glass sheets of shorter vertical dimension previously fabricated. As a result, the incidence of breakage along the bottom edge of longer (i.e., higher) glass sheets was greater than for smaller glass sheets produced earlier.

The tension stress resulting from the temperature gradient developed when a longer glass sheet left the furnace was often too large for the glass sheet to resist spontaneous fracture caused by the unbalanced stress resulting from the glass sheets cooling from top to bottom from vastly different furnace exit temperatures during their transit to the shaping station and from unbalanced stresses induced by contact of the major surfaces of the differentially cooled sheets with the press bending molds.

In U.S. Pat. No. 3,333,934 to Samuel L. Seymour, the bottom edge portion of a glass sheet is exposed to additional selective heating after its removal from the furnace en route to a shaping station. This selective heating is accomplished by directing burning gas in an upward direction from a straight, horizontal, apertured pipe against the lower portion of the glass sheet. The burning gas flows upward over the major surfaces of the glass sheet in such a manner that the heating effect of the rising gas flames is greatest at the lower edge of the glass and diminishes in an upward direction. Since heated glass sheets cool outside the furnace more rapidly at their bottom portion while the rising heat tends to impart some heat to the upper portion of the glass sheet, the upward flow of the gas flames along the glass surface outside the furnace tends to compensate for the natural rate of cooling by providing the greatest concentration of heat where the rate of natural cooling is greatest and a lesser concentration of heat where less heat is required to compensate for the natural cooling effect.

The Seymour patent discloses an elongated pipe having a plurality of closely spaced apertures aligned with and facing upward toward the path of movement taken by the glass sheets. Means is provided for supplying gas under pressure to the elongated apertured pipe for burning at the outlets of the aligned apertures to provide a vertical wall of flame intersecting the horizontally extending path of movement of the glass sheets into the shaping station. The wall of flame so developed originates slightly below the bottom edge of the glass and is directed against the bottom edge of the glass.

The additional heating that the glass sheet undergoes outside the furnace immediately before its shaping enables the glass sheet and particularly its bottom edge portion, to be at a temperature sufficient for shaping without requiring overheating of the glass within the furnace. The additional heating beyond the furnace compensates for the heat loss that takes place while the glass is transferred from the furnace to the shaping station.

The Seymour patent discloses two embodiments. In one, the gas pipe is located at the glass shaping station below and between a pair of press bending molds when the latter are retracted. Since the gas pipe is rigidly placed in position, this embodiment has certain drawbacks in that the heat of the flames causes rapid wear of the press bending molds, particularly their fiber glass covers, when the molds engage the glass sheets.

In a second embodiment of the patented Seymour invention, the shaping station is separated from the exit door of the furnace by a considerable distance and an elongated apertured pipe is rigidly supported between the exit door of the furnace and the glass shaping station. The elongated apertured pipe extends horizontally in longitudinal alignment with the path of movement taken by the glass sheets traversing the path between the furnace and the shaping station. The pipe in this second embodiment terminates short of the shaping station. The gas burner of the second embodiment does not apply the gas flames directly to the covers of the press bending mold. Nevertheless, the bottom edge of the glass is exposed to the ambient atmosphere after it traverses the length of the pipe between the furnace exit and the shaping station. Under such circumstances, the overall heat imparted to the glass sheet within the furnace radiates to cool the glass sheet. Consequently, it is difficult to have the glass sheet maintain a temperature sufficient for shaping at the press bending station using this embodiment. Furthermore, even though the bottom edge of the glass has been heated selectively during its passage toward the shaping station, the bottom edge still has a chance to cool to a temperature at which some chill cracking associated with the establishment of a temporary tension stress can be experienced.

In addition, both embodiments of the Seymour invention, which incorporate a stationary pipe, disclose a straight pipe that extends horizontally. A straight pipe provides clearance for moving a glass sheet, but accomplishes substantially uniform bottom edge heating only for a glass sheet having a straight horizontally extending bottom edge. The need to fabricate bent glass sheets having an edge curved in outline means that the straight pipes needed to insure no interference with the movement of the glass sheets along a path from the furnace to the shaping station and beyond to a cooling station if the latter is needed, would cause non-uniform heating along the length of the bottom edge. This non-uniform heating might induce non-uniform temper stresses in the direction of movement.

Another patent that involves the press bending of glass sheets with auxiliary gas burners is U.S. Pat. No. 3,333,935 to Clement E. Valchar and Stanley J. Mrozinski. In this patent, the auxiliary gas burners are located in position to apply local heat selectively to regions of a glass sheet to be bent sharply to insure rapid flow of the glass regions from a flat to a sharply curved configuration when the glass is bent to a shape involving a non-uniform radius of curvature. In this patent, portions of the covers for the press bending molds are damaged by the localized high heat and require frequent replacement.

At the time of the present invention, the art of shaping large glass sheets by press bending required auxiliary heating means available for use outside the furnace and in closely spaced relation to the furnace and in closely spaced relation to the position occupied by the glass sheet at the press bending station. Such auxiliary heating means were needed to provide a substantially uniform heat along the bottom edge portion of the glass sheet during the time that the glass sheet entered the shaping station. Such auxiliary heating means was also required to avoid harming the covers of the press bending molds when the latter move to close the gap therebetween.

SUMMARY OF THE INVENTION

The present invention uses burning gas source means in conjunction with a pair of press bending molds to shape a heat softened glass sheet outside a hot enclosed atmosphere where the glass sheet is heated to a temperature sufficient for shaping. The present invention directs burning gas from an elongated burning gas source means in the form of an elongated apertured pipe means arranged along one or more parallel lines approximately the shape of the lower edge of the glass sheet toward said lower edge when the latter occupies a shaping position spaced between a pair of press bending molds when the latter are retracted. The burning gas is applied in a vertical direction in spaced relation between the retracted press bending molds and is directed away from the press bending molds as the latter close the space therebetween to impress their complementary shapes onto the glass sheet. In this manner, the lower portion of the glass sheet is heated more uniformly along its length than if it were heated from burning gas directed from a series of openings in an elongated, apertured pipe arranged in a different manner, such as the straight, rigidly supported pipes of the prior art. Furthermore, the burning gas does not impinge on the covers provided for the press bending molds since the burning gas is directed away from the press bending molds when the latter close the space therebetween during a shaping operation.

The present invention is particularly suitable for use in press bending glass sheets having a bottom edge provided with an upturned end portion. In such case, the shaped elongated burning gas source comprises elongated apertured pipe means having an upturned end portion at its downstream end. Glass sheets so contoured in outline are oriented so that the upwardly turned portion faces downstream for the movement of the glass sheet from the hot enclosed atmosphere of the furnace into the shaping station. Since the burning gas is directed through a series of openings provided along the length of shaped pipe means and in apparatus conforming to the present invention, the shaped pipe means is constructed and arranged to pivot about an axis extending approximately parallel to the path of glass movement into the shaping station, the burning gas is directed away from the press bending molds as the molds close the space therebetween during the shaping operation. In addition, rotating the shaped apertured pipe means removes the upturned end portion of the pipe from a position interfering with further glass sheet movement beyond the shaping station and clears the path of glass sheet movement from the shaping station to enable the glass sheet to move beyond the shaping station into a cooling area where the press bent glass sheet is quenched and a temper imparted thereto.

The upwardly turned downstream end portion of the apertured, shaped pipe means also permits the glass sheet to move from the hot enclosed atmosphere of the furnace to the relatively cool atmosphere of the press bending station without interference with the glass sheet movement into the shaping position.

These and other benefits of the present invention will be understood in the light of a description that follows.

BRIEF DESCRIPTION OF THE DRAWINGS

In the drawings that form part of a description of a preferred embodiment of the present invention.

DESCRIPTION OF THE PREFERRED EMBODIMENT

A preferred embodiment of the present invention comprises a tunnel-type furnace 10 extending essentially horizontally and having electrical heating elements 12 disposed along the vertical sidewalls thereof. The heating elements may be other than of the electrical resistance type, such as gas burners which are also well known in the art. However, electrical resistance heaters are preferred for the heating elements 12 along the length of the furnace 10 in order to provide more precise control of the heating pattern throughout the length of the furnace.

Figure 1:
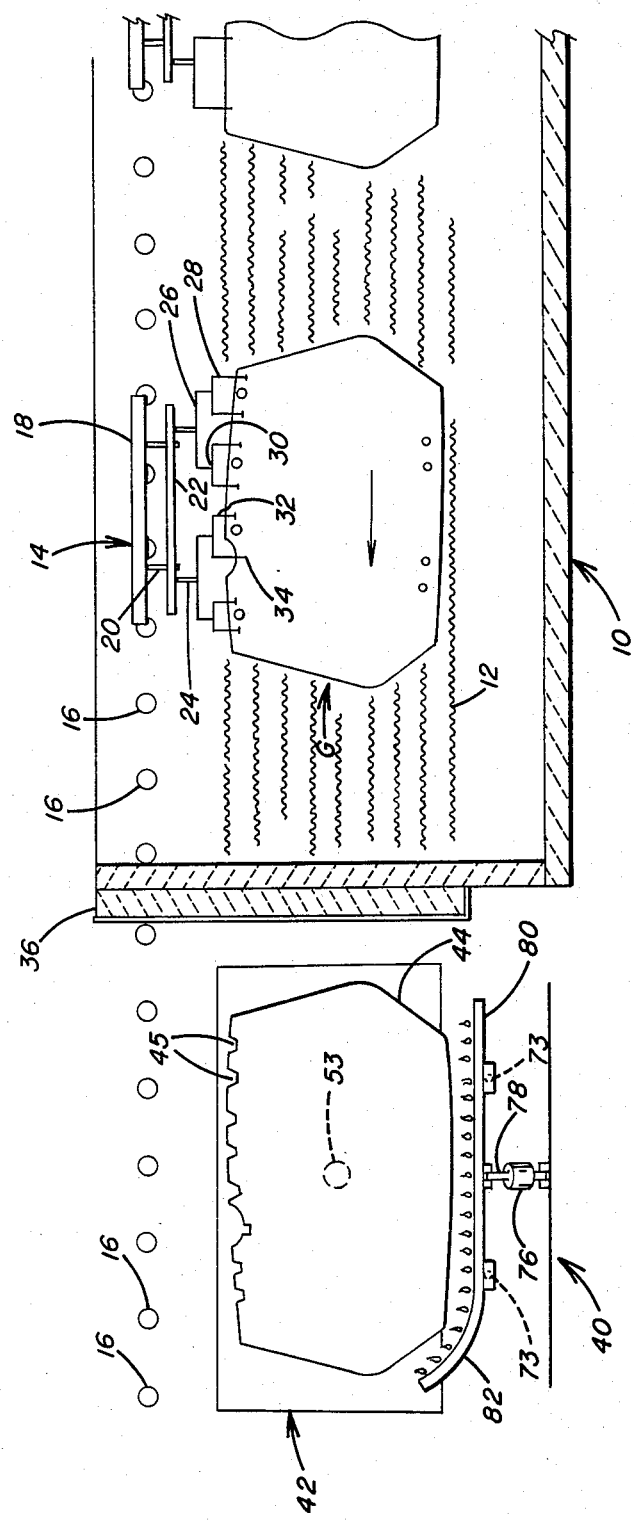
FIG. 1 is a fragmentary, longitudinal sectional view of a portion of a preferred embodiment of the present invention comprising a shaping station provided with a pivotable, shaped, burning gas source means showing the relation of the present invention to a tunnel-type furnace when the shaping station is vacant.
Figure 2:
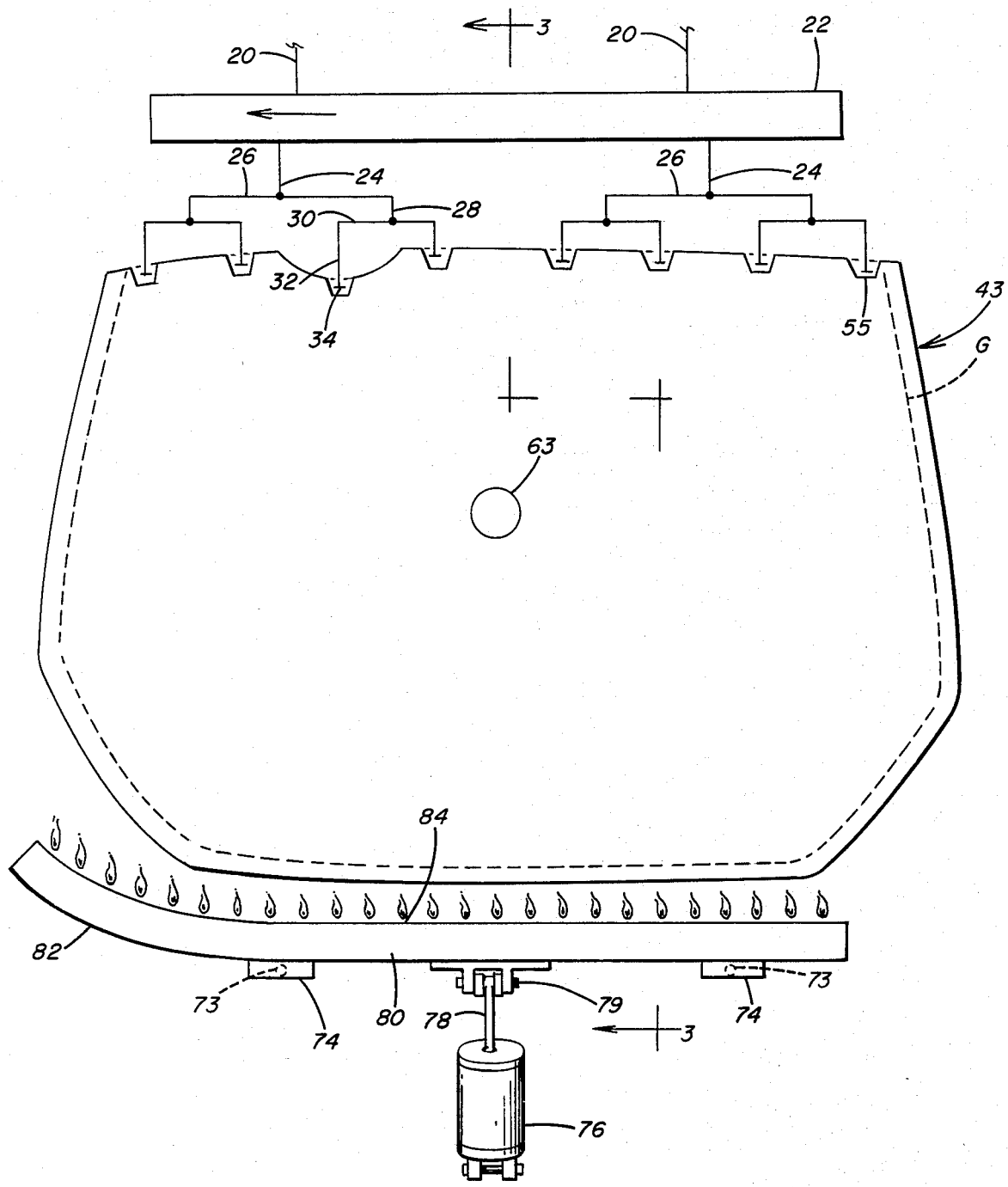
FIG. 2 is a fragmentary, enlarged side view of the shaping station included in FIG. 1, further showing in phantom a glass sheet occupying a shaping position between complementary press bending molds at the shaping station.

FIGS. 1 and 2 also disclose the components of a tong support carriage 14 supported for movement along a path defined by a series of rotatable conveyor rolls 16. The latter extend throughout the length of the furnace 10 and downstream thereof to additional glass sheet processing stations for one or more steps that comprise the method performed by apparatus conforming to the present invention.

The tong support carriage 14 comprises an upper carriage rail 18 that rolls 16 drive by friction when the latter rotate and a plurality of curved vertical support bars 20 connected at their upper end to the carriage rail 18. An upper horizontally extending tong support bar 22 is connected to the lower ends of the vertical support bars 20. A pair of upper vertical tong lever suspension bars 24, each carrying an upper horizontal lever arm 26, is suspended from the upper horizontal tong support bar 22. Each upper horizontal lever arm 26 has suspended therefrom a pair of lower vertical tong lever suspension bars 28. Each of the latter supports a pair of lower horizontal arms 30. Each of the lower horizontal arms 30 has tongs 32 suspended therefrom near each end. The latter are preferably of the self closing type and have glass gripping members 34 at the lower ends thereof.

The upper horizontal lever arms 26 pivot about horizontal axes relative to the upper vertical tong lever suspension bars 24. The latter pivot about their own vertical axes relative to the upper horizontal tong support bar 22. The lower vertical tong lever suspension bars 28 pivot about their own vertical axes relative to upper horizontal lever arms 26. The lower horizontal arms 30 pivot about horizontal axes relative to the bottom of the lower vertical tong lever suspension bars 28. These degrees of freedom enable the glass gripping members 34 at the lower ends of the tongs 32 to follow the shape of the glass sheet G as the shape changes.

The tunnel-type furnace 10 is provided with an exit door 36 and conventional door operating means (not shown) to keep the exit door normally closed and to open the door to move a glass sheet from a position within the hot enclosed atmosphere of the furnace 10 to a downstream position for further processing.

The apparatus of the preferred embodiment of the invention also includes a shaping station 40 immediately downstream of the exit door 36 at the downstream end of the furnace 10. Shaping station 40 comprises a first press bending mold 42 and a second press bending mold 43 (see FIGS. 3 and 4). The press bending molds are of complementary curvature and generally define complementary convex and concave shapes about a vertical axis combined with complementary lazy-S shapes about a horizontal axis. Each of the press bending molds is similar in construction to the type covered in U.S. Pat. No. 3,367,764 to Samuel L. Seymour, the description of which is incorporated herein by reference.

The first press bending mold 42 comprises a first relatively flexible, mold shaping plate 44 having the complicated shape required of the glass sheet G. Along its upper edge, the first mold shaping plate 44 is provided with clearance notches 45 (see FIG. 2). A first mold reinforcing plate 46 is spaced behind the first mold shaping plate 44 with a cover 47 of flexible fiber glass cloth held against the shaping surface of shaping plate 44 by clamping its marginal portion to reinforcing plate 46 (or any other structure suitable to receive a clamped cover). A plurality of adjustable connectors 48 interconnect the first mold shaping plate 44 to the first mold reinforcing plate 46 in positions such as to locally adjust the relatively flexible first mold shaping plate 44 relative to the thicker and, hence, more rigid reinforcing plate 46. The adjustable connectors 48 are of the type disclosed in the aforesaid U.S. Pat. No. 3,367,764 to Seymour. The first press bending mold 42 also includes a back plate 50 with a plurality of rigid connectors 52 connecting the back plate 50 to the first mold reinforcing plate 46 in spaced relation therebehind. A piston rod 53 is attached to the rear surface of the back plate 50 to provide movement of the first press bending mold between a recessed position spaced from and facing said glass shaping position and a glass sheet engaging position at said glass shaping position.

The second press bending mold 43 is similar in construction to first press bending 42 except that the second mold shaping plate 54 for the second press bending mold 43 is complementary in curvature to the shape of the outer surface of the first mold shaping plate 44 and has clearance notches 55 adapted to align with the notches 45 when the molds 42 and 43 close the space therebetween to engage a glass sheet G. The notches 45 and 55 receive the glass engaging members 34 of tongs 32 in the closed mold positions. The second press bending mold 43 has a reinforcing plate 56 similar to reinforcing plate 46, is covered with a flexible fiber glass cover 57 similar to cover 47 and has adjustable connectors 58 operating in a similar manner to that of the adjustable connectors 48 for the first press bending mold 42. The second press bending mold 43 also has a back plate 60 held in spaced relation by rigid connectors 62. A piston rod 63 is provided to actuate movement of the second press bending mold 43 in directions opposite to the motion provided by the first piston rod 53 so that the press bending molds 42 and 43 move in unison in opposite directions from one another.

One of the bending molds, which may be either press bending mold, but illustrated with reference to the second press bending mold 43, is provided with a vertical support plate 70 that extends downward from its back plate 60. The vertical support plate 70 is provided with a pair of longitudinally spaced upper pivot housings 71 and an intermediate lower pivot housing 72. An upper pivoting arm 73 is pivotally connected to each of the upper pivot housings 71 and terminates at a burner support bracket 74. A piston cylinder 76 is pivoted to the lower pivot housing 72 and provided with a piston arm 78 that is pivotally connected at its outer end to an additional burner support bracket 79. The burner support brackets 74 and 79 are connected to burning gas source means 80 shown in the form of pipe means, specifically shown as elongated, aligned twin burner pipes extending in side by side relation, each pipe having an upwardly curved leading edge 82 having a shape conforming to an upwardly turned end portion at the downstream edge of a glass sheet that undergoes treatment. The burner pipes have upwardly directed exit orifices 84 spaced along the length of each pipe to provide proper heating for the bottom edge of a glass sheet by exposing the latter to closely spaced jets of burning gas as the latter traverses the path from the exit 36 of furnace 10 into the press bending station 40. While the illustrated embodiment shows a pair of burner pipes, either more or less than two apertured pipes may be used as the burning gas source means 80 of this invention.

Figure 3:
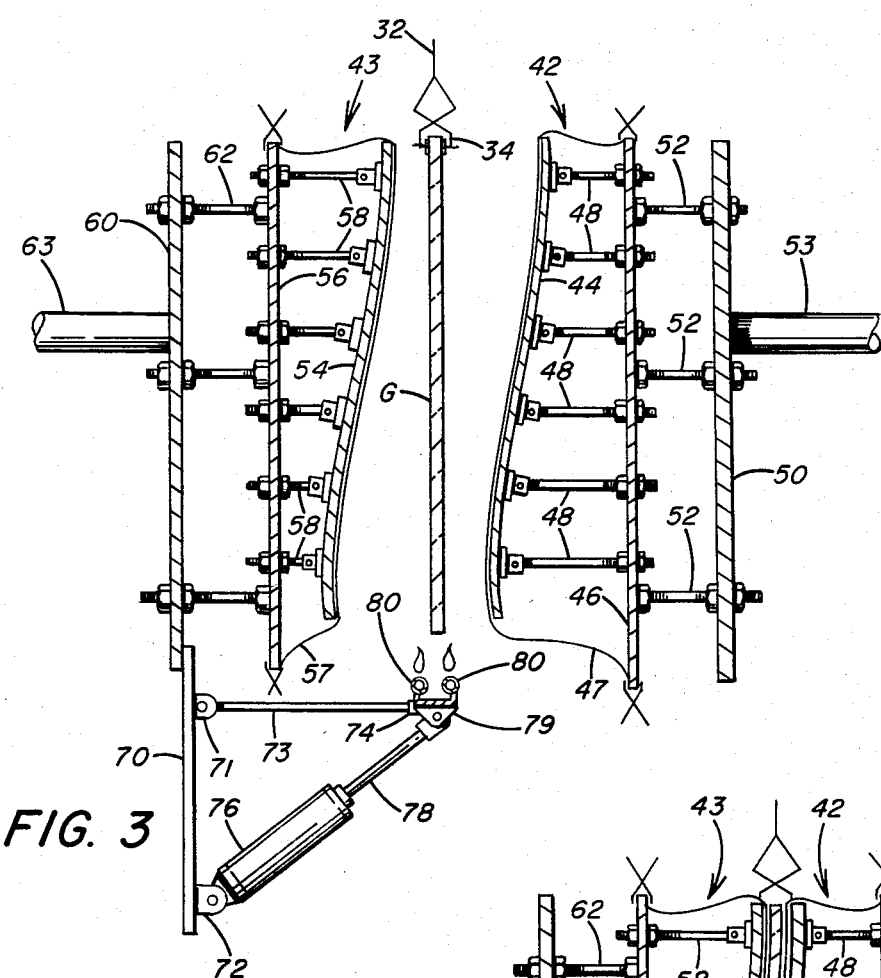
FIG. 3 is a fragmentary sectional view taken along the line 3—3 of FIG. 2 when a glass sheet has arrived at said shaping position with said press bending molds retracted to define a space at said shaping position and said burning gas source means supported in a first position with exit orifices directed toward the bottom edge of said glass sheet.
Figure 4:
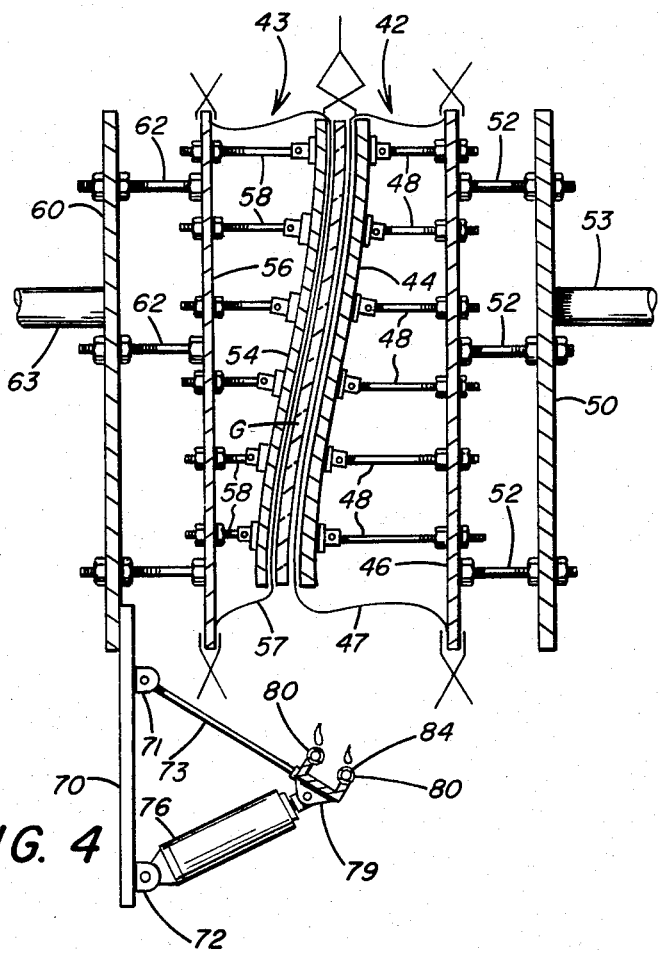
FIG. 4 is a view similar to FIG. 3 taken when the press bending molds have closed said space at said shaping position to shape the glass sheet by press bending, showing how the burning gas source means is simultaneously moved to a second position to avoid harming the press bending molds and to permit the shaped glass sheet to leave said shaping station.

A comparison of FIGS. 3 and 4 demonstrates how the twin burner pipes 80 occupy first and second positions respectively at different stages of a press bending cycle. At the beginning of the cycle when the press bending moldes 42 and 43 are retracted in the retracted mold positions shown in FIG. 3, the piston rod 78 is extended from piston 76 to cause the upper pivoting arms 73 to pivot to horizontal positions to orient the exit orifices 84 upwardly to direct hot burning gas in an edgewise direction toward the bottom edge of the moving glass sheet in spaced relation between the press bending molds 42 and 43. Thus, as a glass sheet leaves the furnace 10 after being heated to a temperature suitable for shaping by press bending, the bottom edge of the glass sheet faces a series of jets of burning gas that occupy said first position throughout the entire path of movement into the shaping position that the glass sheet occupies in spaced alignment between the pair of press bending molds 42 and 43. Each successive increment of the bottom edge of the glass sheet beginning with its downstream end is subjected to successively shorter lengths of jets of burning gas during the transfer of the glass sheet G from the furnace 10 to the shaping station 40.

Since the lower edge of the glass sheet has its downstream end extending obliquely upwardly, the downstream end portion of the glass sheet in its direction of movement is spaced a maximum distance from the burner pipes during its transit into the shaping station 40 and this distance gradually decreases as the leading edge of the bottom portion of the glass sheet approaches the downstream edge of the curved, apertured pipe means. Finally, the entire length of the lower edge is approximately uniformly spaced from the line of burning gas jets at the very last stage of the transit into the shaping station 40. When the glass sheet arrives in its shaping position, the piston rods 53 and 63 are actuated to cause the press bending molds 42 and 43 to close the space therebetween.

As the distance between these molds decreases, it is obvious that the mold covers would be harmed if the pipe means 80 remain in the first position and orientation they occupy in FIG. 3. According to the present invention, the piston 76 is actuated in response to the inward movement of mold 43 to retract the piston rod 78. This causes the upper pivot arms 73 to pivot downward and changes the orientation and position of the pipe means 80 to the second position shown in FIG. 4. In the latter position, jets are directed from the exit orifices 84 in an oblique direction from a pipe position that is relatively remote from the bottom edge of the glass sheet and the corresponding bottom edge portions of the press bending molds 42 and 43. Consequently, the aims of the present invention, to provide additional heat along the length of the bottom edge of a non-rectangular glass sheet undergoing press bending, is accomplished with minimum harm to the press bending molds, particularly their covers.

The form of the invention shown and described in this disclosure represent an illustrative preferred embodiment thereof. It is understood that various changes may be made without departing from the gist of the invention as defined in the claimed subject matter which follows.

We claim:

1. In a method of shaping a glass sheet having a curved lower edge while supported in a vertical or oblique position by heating the glass sheet to a temperature sufficient for shaping in a hot enclosed atmosphere, moving said sheet from said hot atmosphere into a shaping position between a pair of retracted press bending molds of complementary shape and directing burning gas to the lower edge portion of said glass sheet immediately before closing the space between said press bending molds, the improvement comprising directing said burning gas toward said curved lower edge from an apertured pipe means serving as a burning gas source means arranged along a line approximating the shape of the lower edge of said glass sheet until the latter arrives at said shaping position in spaced relation between said press bending molds while said press bending molds are retracted, whereby said press bending molds are free from impingement by said burning gas when they are retracted, and simultaneously directing the burning gas away from said press bending molds as the space between said press bending molds is closed to engage the heat-softened glass sheet between said press bending molds, whereby said press bending molds continue to be free from impingement by said burning gas when they engage said glass sheet, wherein said glass sheet has a bottom edge provided with an upwardly turned end portion, further including moving said glass sheet with its upwardly turned end portion facing downstream and arranging said burning gas source means along a curved line having an upwardly turned downstream end portion, whereby said burning gas source means provides clearance for moving said glass sheet into said shaping position between said retracted press bending molds.

2. The improvement as in claim 1, further including initially supporting said burning gas source means along a line adjacent and below the path taken by said glass sheet en route to said shaping position between said retracted press bending molds and lowering said burning gas source means after said glass sheet arrives at said shaping position and in coordination with the closing of the space between said press bending molds.

3. The improvement as in claim 1, wherein said burning gas is directed from an elongated burning gas source through a line of longitudinally spaced apertures provided along the length of said source.

4. The improvement as in claim 5, wherein said burning gas is directed from an elongated burning gas source through a plurality of closely spaced lines of longitudinally spaced apertures.

* * * * *

UNITED STATES PATENT AND TRADEMARK OFFICE
CERTIFICATE OF CORRECTION

PATENT NO. : 4,488,892

DATED : December 18, 1985

INVENTOR(S) : Robert G. Frank, George R. Claassen, John J. Ewing

It is certified that error appears in the above-identified patent and that said Letters Patent is hereby corrected as shown below:

Column 10, line 29, "5" should be --3--.

Signed and Sealed this

Twenty-first Day of May 1985

[SEAL]

Attest:

DONALD J. QUIGG

Attesting Officer     Acting Commissioner of Patents and Trademarks